(12) United States Patent
Sakai

(10) Patent No.: US 6,694,726 B2
(45) Date of Patent: Feb. 24, 2004

(54) DETERIORATION DIAGNOSIS OF EXHAUST GAS PURIFICATION CATALYST FOR INTERNAL COMBUSTION ENGINE

(75) Inventor: Akikazu Sakai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/265,738

(22) Filed: Oct. 8, 2002

(65) Prior Publication Data

US 2003/0070421 A1 Apr. 17, 2003

(30) Foreign Application Priority Data

Oct. 15, 2001 (JP) ........................................ 2001-316293

(51) Int. Cl.[7] ................................................ F01N 3/00
(52) U.S. Cl. ............................. 60/277; 60/274; 60/285; 60/276
(58) Field of Search ........................ 60/274, 276, 277, 60/285; 123/691, 692

(56) References Cited

U.S. PATENT DOCUMENTS

| 5,207,057 | A | * | 5/1993 | Kayanuma | 60/276 |
|---|---|---|---|---|---|
| 5,233,829 | A | * | 8/1993 | Komatsu | 60/276 |
| 5,271,374 | A | | 12/1993 | Nagaishi et al. | |
| 5,377,484 | A | * | 1/1995 | Shimizu | 60/276 |
| 5,417,058 | A | * | 5/1995 | Shimizu | 60/276 |
| 5,485,382 | A | * | 1/1996 | Seki et al. | 60/285 |
| 5,953,910 | A | | 9/1999 | Sato et al. | |
| 6,347,514 | B1 | * | 2/2002 | Takahashi et al. | 60/285 |

FOREIGN PATENT DOCUMENTS

| JP | 6-193435 | 7/1994 |
|---|---|---|
| JP | 7-63045 | 3/1995 |

* cited by examiner

Primary Examiner—Thomas Denion
Assistant Examiner—Diem Tran
(74) Attorney, Agent, or Firm—Foley & Lardner

(57) ABSTRACT

In an internal combustion engine (1,100), a first exhaust passage (10A) having an oxygen storing catalyst (11A) is connected to cylinders of a first group (1A), and a second exhaust passage (10B) having an oxygen storing catalyst (11B) is connected to cylinders of a second group (1B). These exhaust passages are joined as a collective exhaust passage (10C). Normally, the air-fuel ratio of the first group (1A) is feedback controlled based on the oxygen concentration of the first exhaust passage (10A), and the air-fuel ratio of the second group (1B) is feedback controlled based on the oxygen concentration of the second exhaust passage (10B). When deterioration of the catalysts is diagnosed, the phases of the air-fuel ratio are made to coincide with each other between the groups by performing feedback correction of the air-fuel ratio of all groups based on the oxygen concentration of the first exhaust passage (10A).

9 Claims, 11 Drawing Sheets

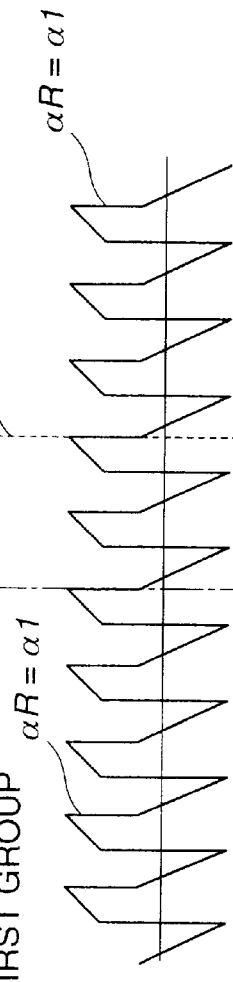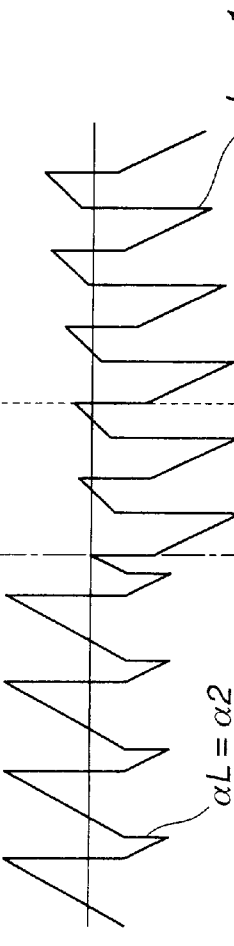
FIG. 12A
FIG. 12B

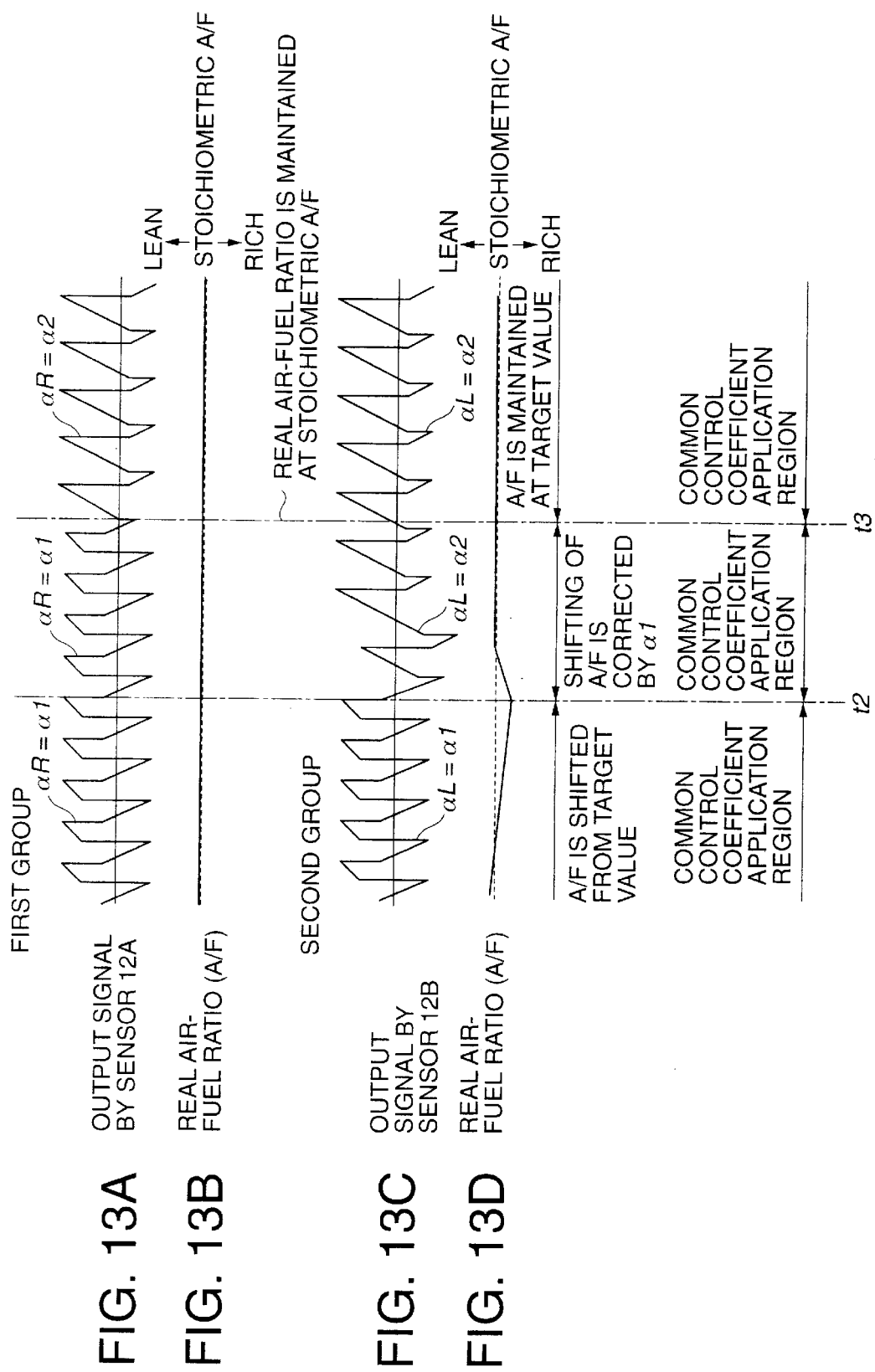

DETERIORATION DIAGNOSIS OF EXHAUST GAS PURIFICATION CATALYST FOR INTERNAL COMBUSTION ENGINE

FIELD OF THE INVENTION

This invention relates to deterioration determination of a three-way catalyst which purifies exhaust gas from an internal combustion engine.

BACKGROUND OF THE INVENTION

Tokkai Hei No. 7-63045 published by the Japanese Patent Office in 1995 discloses a device for determining the deterioration of a three-way catalyst which purifies exhaust gas of a V-type internal combustion engine wherein the engine cylinders are separated into two banks. The three-way catalyst is formed in an exhaust passage downstream of the confluence point of the exhaust gas discharged from the cylinders of each bank. The deterioration determination device is provided with two upstream oxygen sensors which detect the oxygen concentration in the exhaust gas for each bank, and a downstream oxygen sensor which detects the oxygen concentration downstream of the three-way catalyst. The air-fuel ratio of the fuel mixture supplied to the engine is controlled for each bank.

Namely, feedback control of the air-fuel ratio is performed for each bank so that a fuel mixture having the stoichiometric air-fuel ratio is supplied to the corresponding bank based on the output of the upstream oxygen sensor of each bank.

In air-fuel ratio feedback control, when the output of the downstream oxygen sensor does not follow the output inversion of the upstream oxygen sensor, it is determined that the three-way catalyst is not deteriorated.

On the other hand, when it follows the output inversion of the upstream oxygen sensor, it is determined that the three-way catalyst is deteriorated.

However, if the air-fuel ratio of one bank is shifted to rich and the air-fuel ratio of another bank shifts to lean at the same time, the output of the downstream oxygen sensor will stabilize at the stoichiometric air-fuel ratio, and the number of output inversions of the downstream oxygen sensor will decrease.

Consequently, even when the three-way catalyst has deteriorated, it may be determined that it has not deteriorated. In order to avoid such a diagnosis error, the prior art device prohibits deterioration determination of the three-way catalyst when the air-fuel ratio variation pattern of one bank is inverted from that of the other bank.

Tokkai Hei No. 6-193435 published by the Japanese Patent Office in 1994 discloses performing deterioration determination of the three-way catalyst based only, on the output of the downstream oxygen sensor in a V-type internal combustion engine wherein a three-way catalyst is provided for every bank.

SUMMARY OF THE INVENTION

Both of the above prior arts perform catalyst deterioration diagnosis in air-fuel ratio feedback control to the stoichiometric air-fuel ratio. In an engine which has few operation opportunities at the stoichiometric air-fuel ratio, as in the case of a direct-injection engine or a lean burn engine, if the deterioration determination is increasingly prohibited as in the former prior art, the opportunities for deterioration diagnosis of the catalyst will become less and less.

In the latter prior art, as the air-fuel ratio of each bank during catalyst deterioration diagnosis is controlled only according to the output of the downstream oxygen sensor, compared with the case where oxygen concentration and air-fuel ratio control is performed for each bank, the real air-fuel ratio of each bank tends to shift from the target stoichiometric air-fuel ratio. Such a shift of air-fuel ratio decreases the exhaust gas purification performance of the three-way catalyst with which each bank is equipped.

It is therefore an object of this invention to ensure opportunities for deterioration diagnosis of a catalyst while maintaining the precision of the diagnosis.

It is a further object of this invention to prevent a shift of a real air-fuel ratio from the target air-fuel ratio in deterioration diagnosis of a catalyst.

In order to achieve the above objects, this invention provides an air-fuel ratio control device for such an internal combustion engine that comprises a first exhaust passage connected to a first cylinder and provided with a first exhaust gas purification device which has an oxygen storage function, a second exhaust passage connected to a second cylinder and provided with a second exhaust gas purification device which has an oxygen storage function, and a collective exhaust passage which collects exhaust gas from the first exhaust passage and the second exhaust passage The control device comprises a first fuel supply device which supplies fuel to the first cylinder to generate an air-fuel mixture to be burned in the first cylinder, a second fuel supply device which supplies fuel to the second cylinder to generate all air-fuel mixture to be burned in the second cylinder, a first oxygen sensor which reacts to an oxygen concentration in exhaust gas in the first exhaust passage upstream of the first exhaust gas purification device, a second oxygen sensor which reacts to an oxygen concentration in exhaust gas in the second exhaust passage upstream of the second exhaust gas purification device, a third oxygen sensor which reacts to an oxygen concentration in exhaust gas in the collective exhaust passage, and a programmable controller.

The controller is programmed to calculate a first feedback correction coefficient for controlling an air-fuel ratio of the air-fuel mixture in the first cylinder to a target air-fuel ratio based on a reaction of the first oxygen sensor, feedback control a fuel supply amount of the first fuel supply device using the first feedback correction coefficient, calculate a second feedback correction coefficient for controlling an air-fuel ratio of the air-fuel mixture in the second cylinder to the target air-fuel ratio based on a reaction of the second oxygen sensor, feedback control a fuel supply amount of the second fuel supply device using the second air-fuel ratio feedback correction coefficient, determine whether or not a predetermined condition for performing deterioration diagnosis of the exhaust purification devices is satisfied, and perform the deterioration diagnosis of the exhaust purification devices, when the predetermined condition is satisfied, based on a reaction of the third oxygen sensor while feedback controlling the fuel supply amount of the first fuel supply device and the fuel supply amount of the second fuel supply device using the first feedback correction coefficient.

This invention also provides a control method for such an internal combustion engine that comprises a first exhaust passage connected to a first cylinder and provided with a first exhaust gas purification device which has an oxygen storage function, a second exhaust passage connected to a second cylinder and provided with a second exhaust gas purification device which has an oxygen storage function, a collective exhaust passage which collects exhaust gas from the first exhaust passage and the second exhaust passage, a first fuel supply device which supplies fuel to the first cylinder to generate an air-fuel mixture to be burned in the first cylinder, and a second fuel supply device which supplies fuel to the second cylinder to generate an air-fuel mixture to be burned in the second cylinder.

The method comprises detecting a first oxygen concentration in exhaust gas ill the first exhaust passage upstream of the first exhaust gas purification device, detecting a second oxygen concentration in exhaust gas in the second exhaust passage upstream of the second exhaust gas purification device, detecting a third oxygen concentration in exhaust gas in the collective exhaust passage, calculating a first feedback correction coefficient for controlling an air-fuel ratio of the air-fuel mixture in the first cylinder to a target air-fuel ratio based on the first oxygen concentration:

feedback controlling a fuel supply amount of the first fuel supply device using the first feedback correction coefficient, calculating a second feedback correction coefficient for controlling an air-fuel ratio of the air-fuel mixture in the second cylinder to the target air-fuel ratio based on the second oxygen concentration, feedback controlling a fuel supply amount of the second fuel supply device using the second air-fuel ratio feedback correction coefficient, determining whether or not a predetermined condition for performing deterioration diagnosis of the exhaust purification devices is satisfied, and performing the deterioration diagnosis of the exhaust purification devices, when the predetermined condition is satisfied, based on the third oxygen concentration while feedback controlling the fuel supply amount of the first fuel supply device and the fuel supply amount of the second fuel supply device using the first feedback correction coefficient.

The details as well as other features and advantages of this invention are set forth in the remainder of the specification and are shown in the accompanying drawings.

BRIEF DESCRIPTION OF THE DRAWINGS

FIGS. 12A and 12B are timing charts describing a variation of the air-fuel ratio in the engine cylinders of the first group and that of the second group, under the air-fuel ratio control according to this invention.

FIGS. 13A–13D are timing charts describing a variation of the air-fuel ratio in the engine cylinders of the first group and that of the second group which will appear following the variations shown in FIGS. 12A and 12B.

DESCRIPTION OF THE PREFERRED EMBODIMENTS

Figure 1:
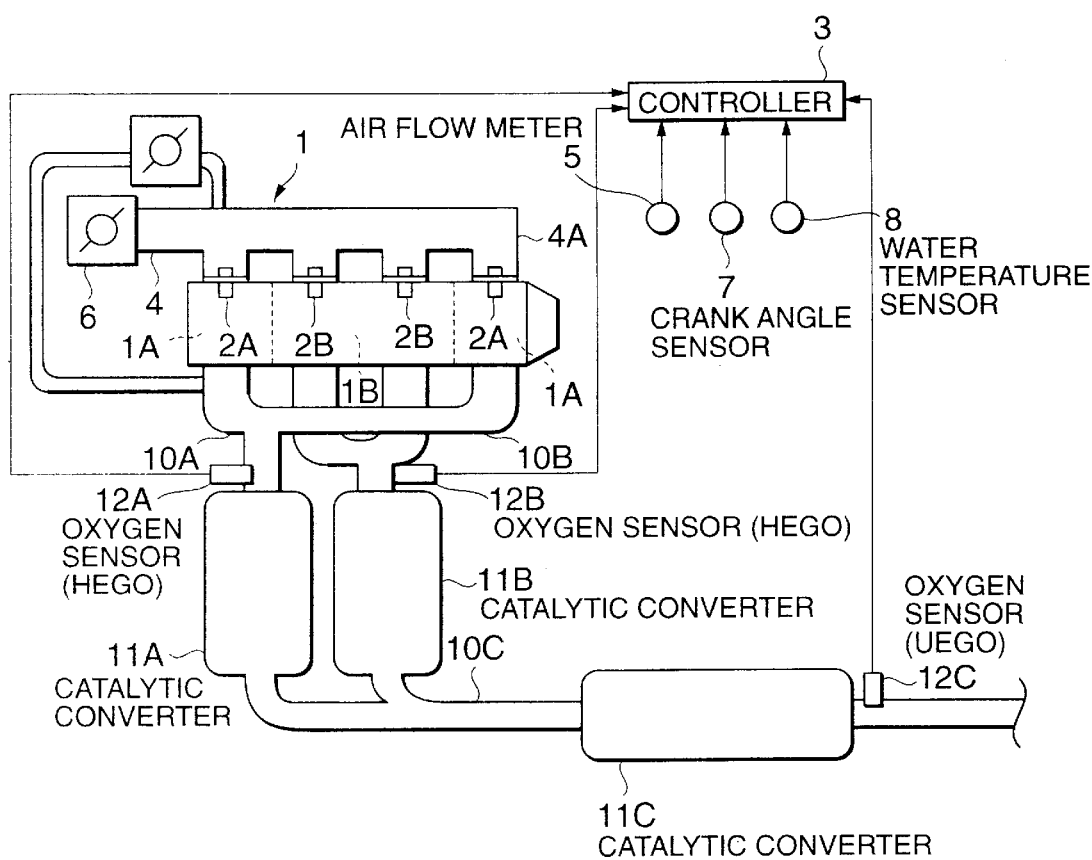
FIG. 1 is a schematic block diagram of an air-fuel ratio control system according to this invention having a catalyst deterioration diagnostic function for an in-line four-cylinder internal combustion engine.

Referring to FIG. 1 of the drawings, an in-line four-cylinder four-stroke cycle internal combustion engine 1 for a vehicle is provided with an intake pipe 4 and an intake manifold 4A for aspirating fresh air into each cylinder. A throttle 6 which adjusts an air amount is installed in the intake pipe 4. Each cylinder is provided with a fuel injector 2A or 2B which injects fuel into the air supplied from the inlet manifold 4A to each cylinder. The fuel injectors 2A, 2B inject fuel of an amount according to an injection pulse signal from a controller 3 in a predetermined sequence.

The fuel injected from the fuel injector 2A or 2B mixes with the air supplied from the inlet manifold 4A to form an air-fuel mixture. This air-fuel mixture is burnt in each cylinder in a predetermined sequence, and causes pistons in the cylinders to perform a reciprocating motion. The combustion gas produced as a result of combustion is discharged by exhaust pipes 10A, 10B.

Here, the exhaust pipe 10A is connected to two cylinders of a first group 1A situated at the ends of the engine 1, and the exhaust pipe 10B is connected to two cylinders of a second group 1B situated in the center of the engine 1, respectively. The exhaust pipes 10A, 10B are joined to form a collective exhaust pipe 10C. A catalytic converter 11B is provided in the exhaust pipe 10A, a catalytic converter 11B is provided in the exhaust pipe 10B, and a catalytic converter 11C is provided in the exhaust pipe 10C, respectively.

The catalytic converters 11A, 11B, 11C contain a three-way catalyst using a noble metal such as platinum (Pt). The three-way catalyst reduces the nitrogen oxides (NOx) and oxidizes hydrocarbons (HC) and carbon monoxide (CO) in the exhaust gas due to combustion of the air-fuel mixture of the stoichiometric air-fuel ratio in the engine 1 so as to purify the exhaust gas. The three-way catalyst stores the residual oxygen in the exhaust gas, and releases the stored oxygen when the amount of hydrocarbons (HC) and carbon monoxide (CO), which are reducing agent components in the exhaust gas, increase.

Here, the exhaust gas containing a large amount of oxygen corresponds to exhaust gas obtained by combustion of an air-fuel mixture having a lean air-fuel ratio, and exhaust gas containing a large amount of reducing agent corresponds to exhaust gas obtained by combustion of an air-fuel mixture having a rich air-fuel ratio. If the catalytic function of the three-way catalyst deteriorates, this oxygen storage function will also decline. Therefore, deterioration of a three-way catalyst can be diagnosed by diagnosing oxygen storage capability. An algorithm for such a deterioration diagnosis is known from U.S. Pat. No. 5,953,910.

However, the catalyst in the catalytic converters 10A–10C is not limited to a three-way catalyst. The catalyst deterioration diagnosis according to this invention may be applied to any sort of catalyst which has an oxygen storage function. Further, this invention may be applied not only to a catalyst, but also to deterioration diagnosis of a hydrocarbon (HC) trap having oxygen storage functions.

The controller 3 diagnoses deterioration of the catalyst of the catalytic converters 11A, 11B, 11C while controlling the air-fuel ratio of the air-fuel mixture supplied to each cylinder to a target air-fuel ratio, by control of the fuel injection amount of the fuel injectors 2A, 2B.

For this purpose, signals from a crank angle sensor 7 which detects a predetermined rotation position and a rotation speed Ne of the engine 1, an air flow meter 5 which detects an air flow rate in the intake pipe 4, and a water temperature sensor 8 which detects a cooling water temperature of the engine 1, are input into the controller 3, respectively.

Signals from an upstream oxygen sensor 12A which reacts to the oxygen concentration of the exhaust gas in the exhaust pipe 10A upstream of the catalytic converter 11A, an upstream oxygen sensor 12B which reacts to the oxygen concentration of the exhaust gas in the exhaust pipe 10B upstream of the catalytic converter 11B, and a downstream oxygen sensor 12C which reacts to the oxygen concentration of the exhaust gas in the exhaust pipe 10C upstream of the catalytic converter 11C, are also input to the controller 3.

The upstream oxygen sensors 12A, 12B are sensors which identify whether the air-fuel ratio of the air-fuel mixture which has generated the exhaust gas is lean or rich with respect to the stoichiometric air-fuel ratio on the basis of the oxygen concentration of the exhaust gas produced by combustion of the air-fuel mixture. One example of such a sensor is a heated exhaust gas oxygen sensor (HEGO).

On the other hand, the oxygen sensor 12C is a universal exhaust gas oxygen sensor (UEGO) which measures the degree of leanness or richness of the air-fuel ratio of the air-fuel mixture generating the exhaust gas.

Figure 2:
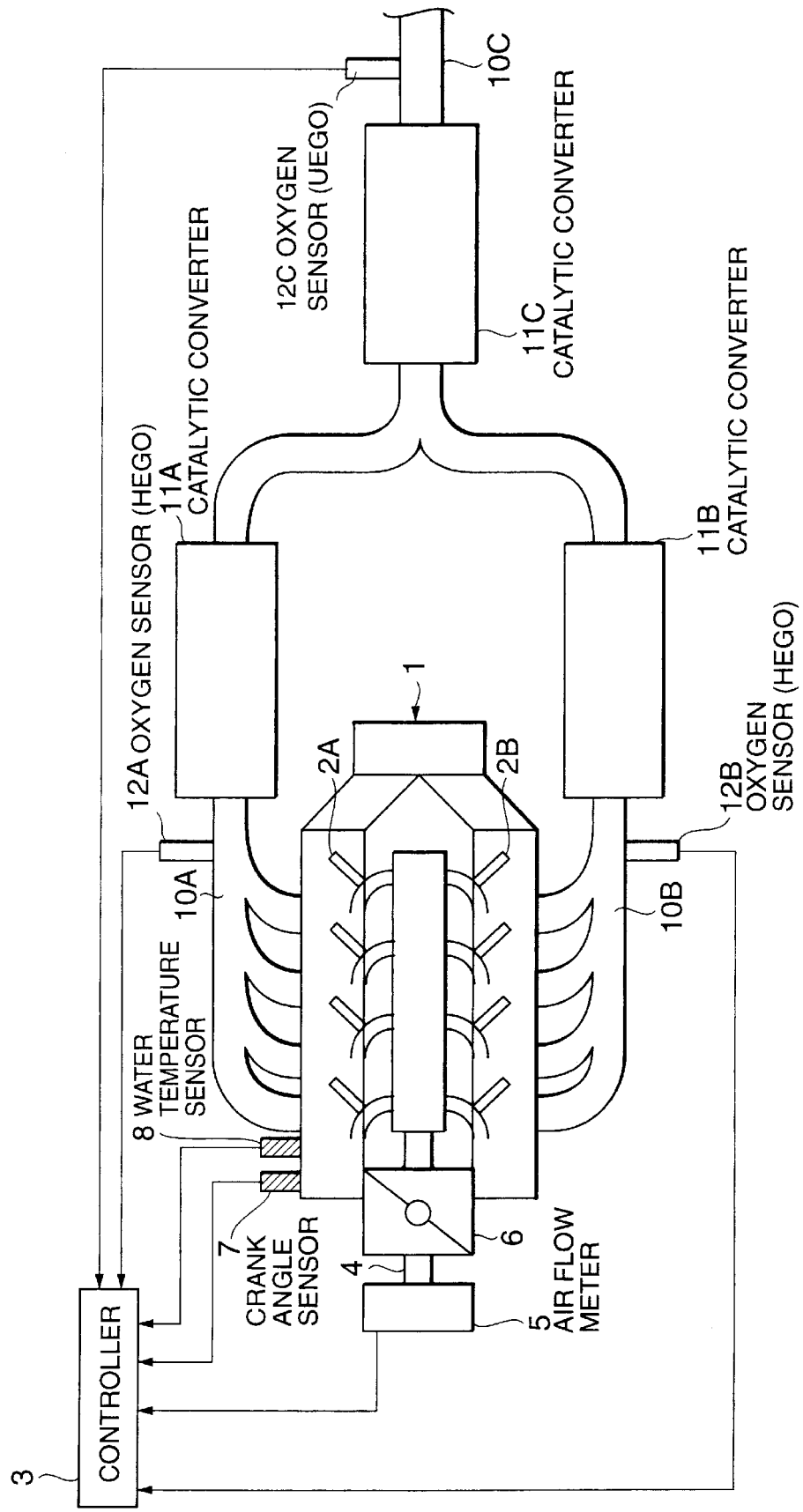
FIG. 2 is a schematic block diagram of an air-fuel ratio control system having a catalyst deterioration diagnostic function according to this invention for a V-type eight-cylinder internal combustion engine.

Next, another type of engine to which this invention can be applied, will be described referring to FIG. 2.

A V-type four-stroke cycle eight-cylinder internal combustion engine 100 is provided with four cylinders in each of two banks, respectively. Let the cylinders of the first bank be a first group 1A, and the cylinders of the second bank be a second group 1B.

Air is supplied to each cylinder of the first group 1A and second group 1B via a common inlet pipe 4. The throttle 6 which adjusts the amount of air is installed in the inlet pipe 4.

A first injector 2A is provided in each cylinder of the first group 1A, respectively. A second injector 2B is provided in each cylinder of the second group 1B, respectively. The fuel injectors 2A, 2B inject fuel of an amount according to an injection pulse signal from the controller 3 in a predetermined sequence. The injected fuel mixes with the air aspirated by each cylinder from the inlet pipe 4 to generate an air-fuel mixture, and the air-fuel mixture is burnt in each cylinder in a predetermined sequence.

The combustion gas of each cylinder of the first group 1A is discharged by an exhaust pipe 10A. The combustion gas of, each cylinder of the second group 1B is discharged by an exhaust pipe 10B. The exhaust pipes 10A, 10B are joined to form a collective exhaust pipe 10C.

A catalytic converter 11A is provided in the middle of the exhaust pipe 10A, and a catalytic converter 11B is provided in the middle of exhaust pipe 10B, respectively. A catalytic converter 11C is provided also in the middle of the collective exhaust pipe 10C.

This invention can be applied to the engine which has cylinders partitioned into two or more groups as regards the exhaust gas system, as shown by the engines 1 and 100.

For both the engine 1 and 100, the controller 3 performs feedback control of the air-fuel ratio of the air-fuel mixture supplied to each cylinder to the stoichiometric air-fuel ratio, which is a target air-fuel ratio in a certain engine running condition, based on the output of the upstream oxygen sensors 12A, 12B, by varying the fuel injection amount of the fuel injectors 2A, 2B. Open loop control of the air-fuel ratio is used together with feedback control by making the air-fuel ratio feedback correction coefficient learned in the process of feedback control, a learning correction coefficient.

The controller 3, in the air-fuel ratio control process, also performs deterioration diagnosis of the three-way catalyst of the catalytic converters 11A–11C based on the output of the downstream oxygen sensor 12C under predetermined conditions. This is performed on the three catalysts as a whole, rather than performing deterioration diagnosis of each catalyst individually.

The controller 3 which performs the above control comprises a microcomputer comprising a central processing unit (CPU), read-only memory (ROM), random access memory (RAM) and the input/output interface (I/O interface). The controller may also comprise two or more microcomputers.

Next, the details of the air-fuel ratio control and deterioration diagnosis of the catalyst performed by the controller 3 will be described referring to the flowcharts of FIGS. 3–10 and FIGS. 11A and 11B.

Figure 3:
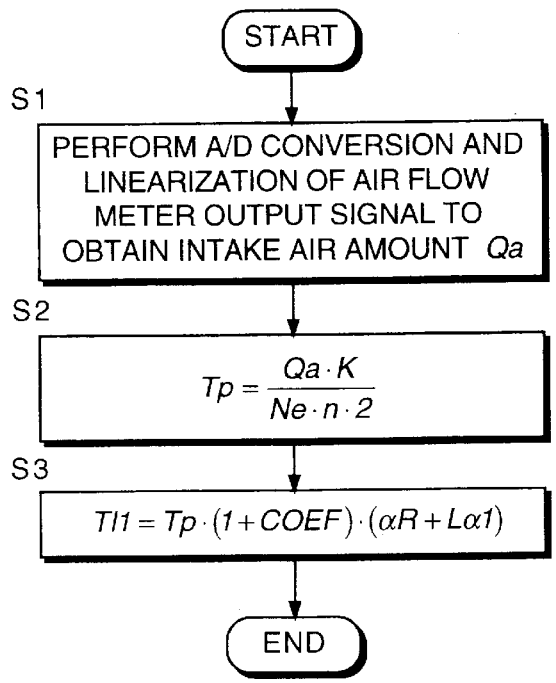
FIG. 3 is a flowchart describing a routine performed by a controller according to this invention for calculating a fuel injection amount for engine cylinders of a first group.
Figure 4:
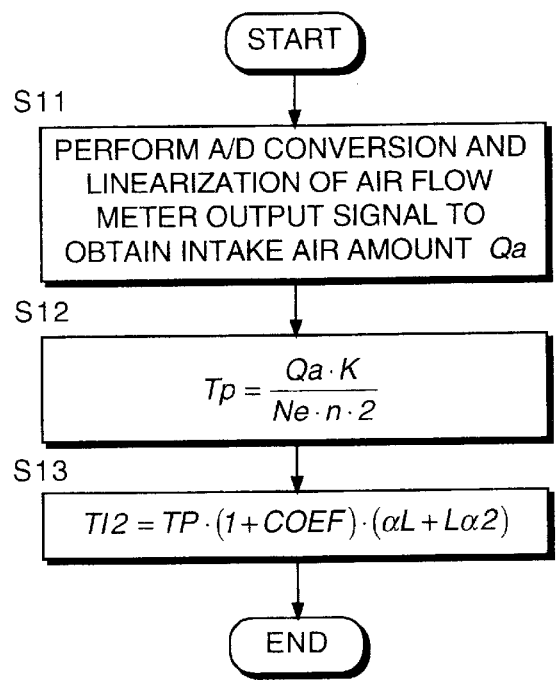
FIG. 4 is similar to FIG. 3, but describing a routine for calculating a fuel injection amount for engine cylinders of a second group.
Figure 11A:
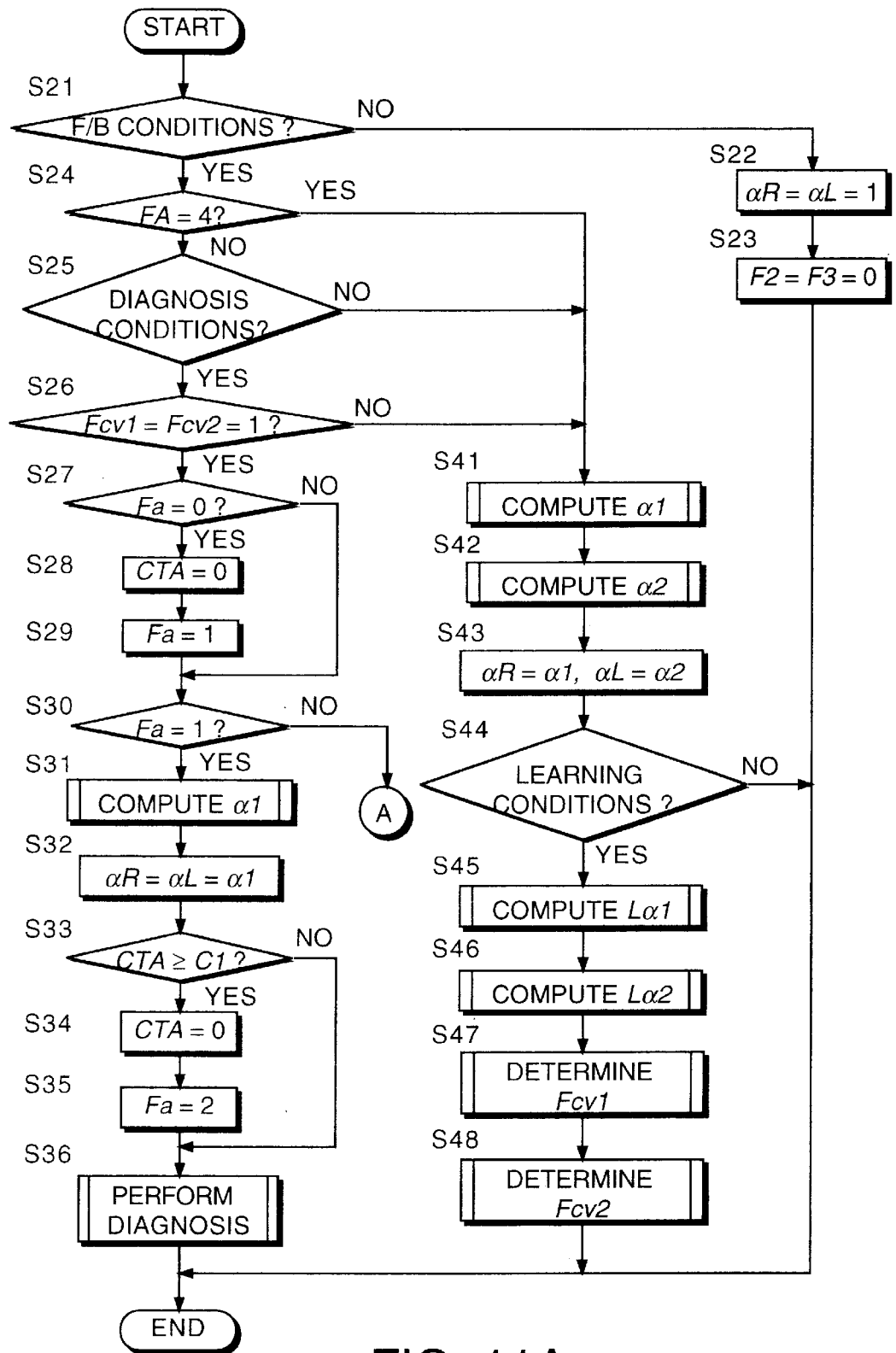
FIGS. 11A and 11B are flowcharts describing an integrated routine for air-fuel ratio control and catalyst deterioration diagnosis performed by the controller.
Figure 11B:
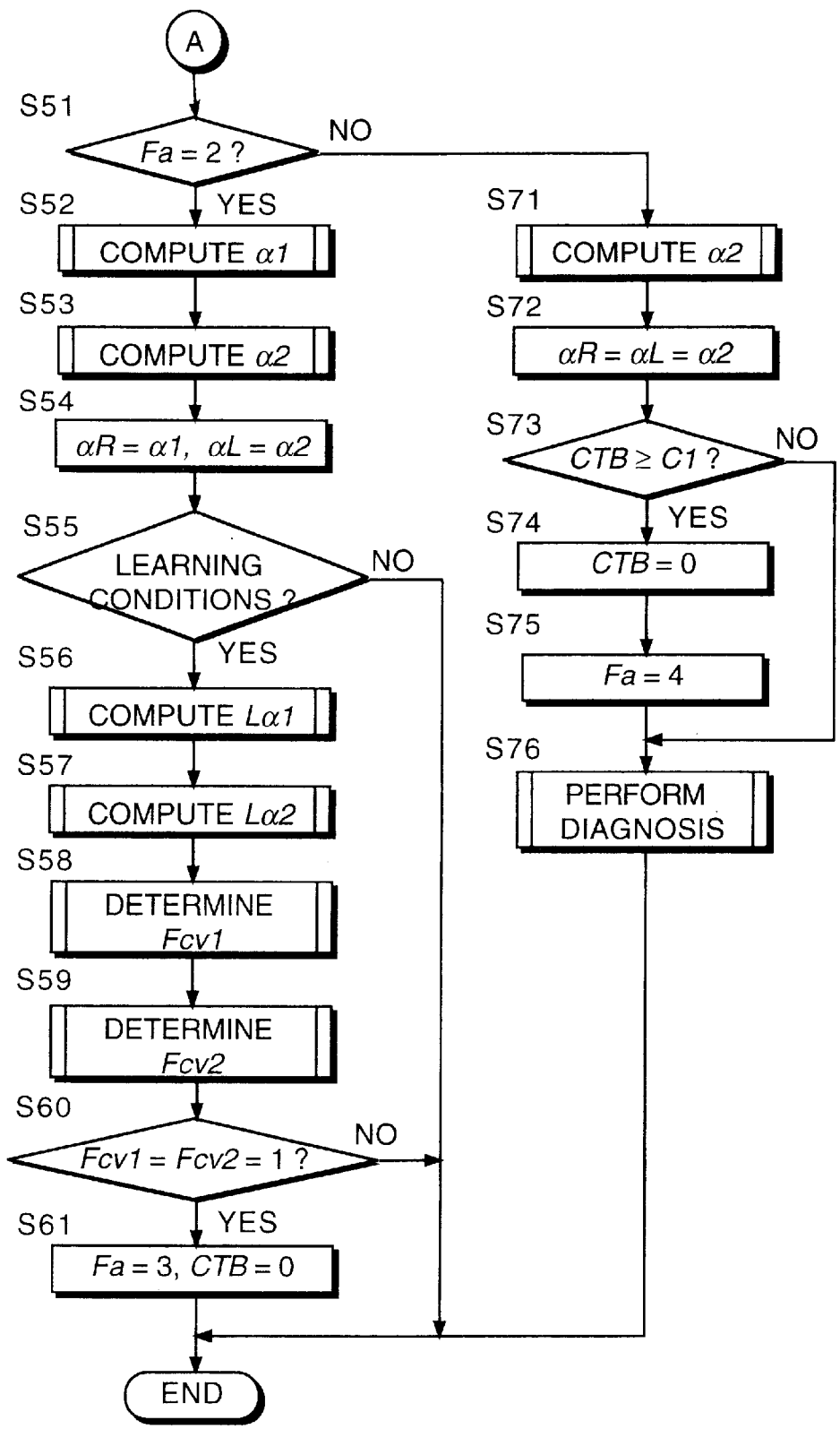

FIG. 3 shows a routine for calculating a pulse width TI1 output to the fuel injector 2A, and FIG. 4 shows a routine for calculating a pulse width TI2 output to the fuel injector 2B. The fuel injectors 2A, 2B continue fuel injection over the period corresponding to these pulse widths. In other words, the pulse widths TI1 and TI2 correspond to the fuel injection amounts of the fuel injectors 2A, 2B. FIGS. 11A and 11B show an integrated routine for air-fuel ratio control and catalyst deterioration diagnosis.

FIGS. 5–10 show subroutines performed in the routine of FIGS. 11A and 11B. The controller 3 repeats the routines of FIGS. 3 and 4 at intervals of ten milliseconds during operation of the engine 1 (100), respectively. The controller 3 performs the routine of FIGS. 11A and 11B in synchronism with a Ref signal which is output by the crank angle sensor 7 at a predetermined stroke position of the piston of each cylinder.

First, referring to FIG. 3, in a step S1, the controller 3 performs analog/digital conversion of the air flow rate detected by the air flow meter 5, and calculates an intake air amount Qa of each cylinder by linearizing by a predetermined calculation processing.

In a following step S2, a basic fuel injection amount Tp is calculated by the next Equation (1) using the intake air amount Qa, the rotation speed Ne of the engine 1 (100) detected by the crank angle sensor 7, a number n of the cylinders of the engine 1 (100), and a constant K.

$$Tp = \frac{Qa \cdot K}{Ne \cdot n \cdot 2} \quad (1)$$

The denominator 2 of Equation (1) is a multiplier which reflects that combustion of the air-fuel mixture in each cylinder is performed once every two rotations in the four stroke cycle engine 1 (100).

In a following step S3, the fuel injection pulse width TI1 of the fuel injector 2A is calculated by the next Equation (2).

$$TI1 = Tp \cdot (1 + COEF) \cdot (\alpha R + L\alpha 1) \quad (2)$$

where,

COEF=correction value based on the cooling water temperature of the engine 1 (100), αR=air-fuel ratio feedback correction coefficient for first group 1A, and Lα1 learning correction coefficient for first group 1A.

The air-fuel ratio feedback correction coefficient αR for the first group 1A, and the learning correction coefficient Lα1 for the first group 1A are determined by the integrated routine of FIGS. 11A and 11B which was performed immediately before the execution of this routine. After the processing of the step S3, the controller 3 terminates the routine.

The routine of FIG. 4 is a routine which performs calculation of the fuel injection pulse width TI2 of the fuel injector 2B of the second group 1B. The processing of a step S11 is identical to the processing of the step S1 of the routine of FIG. 3, and the processing of a step S12 is identical to the processing of the step S2 of the routine of FIG. 3. In a step S13, the fuel injection pulse width TI2 is calculated by the next Equation (3) which is similar to Equation (2) using an air-fuel ratio feedback correction coefficient αL and a learning correction coefficient Lα2, for the second group 1B.

$$TI2 = TP \cdot (1 + COEF) \cdot (\alpha L + L\alpha 2) \quad (3)$$

The air-fuel ratio feedback correction coefficient αL and the learning correction coefficient Lα2 for the second group 1B are determined by the integrated routine of FIGS. 11A and 11B which was performed immediately before the execution of this routine. After the processing of the step S13, the controller 3 terminates the routine.

Next, the integrated routine for air-fuel ratio control and catalyst deterioration diagnosis will be described, referring to FIGS. 11A and 11B.

First, in a step S21, the controller 3 determines whether or not air-fuel ratio feedback conditions are satisfied.

This determination is performed by determining whether or not the running condition of the engine 1 (100) corresponds to a predetermined air-fuel ratio feedback region, by looking up a map stored beforehand in the memory, based on the engine rotation speed Ne and the fuel injection pulse widths TI1, TI2 which were calculated in the routines of FIGS. 3 and 4 immediately before the execution of this routine.

When the air-fuel ratio feedback conditions are not satisfied, in a step S22, the feedback correction coefficient αR for the first group 1A and feedback correction coefficient αL for the second group 1B are clamped to unity, respectively. In a following step S23, two inversion flags F2, F3 are respectively reset to zero. The inversion flags F2, F3 will be described later.

After the processing of the step S23, the controller 3 terminates the routine.

When the air-fuel feedback conditions are not satisfied, the fuel injection amount is calculated according to the routine of FIGS. 3 and 4 with the air-fuel ratio feedback correction coefficient set to unity. However, regarding the learning correction coefficients Lα1, Lα2, the values calculated on the immediately preceding occasion are used.

Immediately after start-up of the engine 1 (100), the air-fuel ratio feedback conditions are not satisfied, so the processing of the steps S22, S23 is performed first.

When the air-fuel ratio feedback conditions are satisfied in the step S21, in a step S24, the controller 3 determines whether or not a control mode flag Fa is four. Deterioration diagnosis of the catalyst is performed only once during the operation of the engine 1 (100), and the control mode flag Fa is set to four in a step S65, described later. If the control mode flag Fa is four in the step S24 it means that deterioration diagnosis of the catalyst has completed.

When the control mode flag Fa is four, in steps S41–S48, the controller 3 performs ordinary air-fuel ratio feedback control and learning control.

In the step S24, when the control mode flag Fa is not four, the controller 3, in a step S25, determines whether or not catalyst deterioration diagnostic conditions are satisfied. The catalyst deterioration diagnostic conditions are disclosed in the above U.S. Pat. No. 5,953,910. and their description here will be omitted.

When catalyst deterioration diagnostic conditions are not satisfied, in the steps S41–S48, ordinary air-fuel ratio feedback control and learning control are performed.

When catalyst deterioration diagnostic conditions are satisfied, in a step S26, the controller 3 determines whether or not the learning correction coefficients. Lα1 Lα2 for the first group 1A and second group 1B, are both converging. This determination is performed by determining whether two convergence flags Fcv1, Fcv2 set in steps S47, S48 mentioned below are unity.

When both the convergence flags Fcv1, Fcv2 are unity, the controller 3 proceeds to the processing of a step S27. When one of the convergence flags Fcv1, Fcv2 is not unity, the controller 3, in the steps S41–S48, performs ordinary air-fuel ratio feedback control and learning control.

Next, the processing of the steps S41–S48 will be described.

The processing of the steps S41–S48 is performed when catalyst deterioration diagnosis has completed, when catalyst diagnostic conditions are not satisfied, and when learning of the air-fuel ratio feedback correction coefficients has not converged. As catalyst diagnostic conditions are not satisfied immediately after satisfying the air-fuel ratio feedback conditions in the step S21, the processing of the steps S41–S48 is performed first when the air-fuel ratio feedback conditions of the step 21 are satisfied for the first time after the engine start-up.

Figure 5:
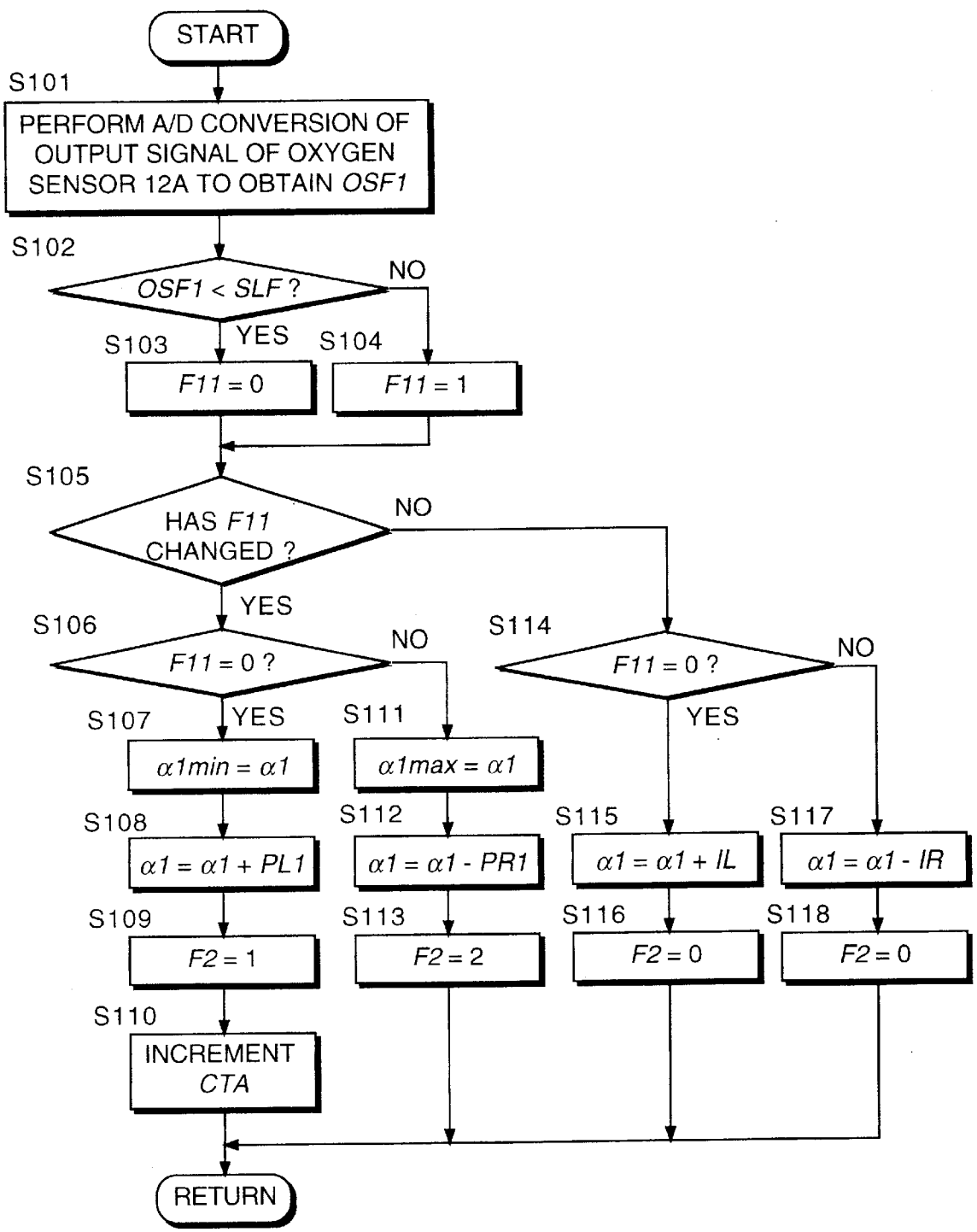
FIG. 5 is a flowchart describing a subroutine performed by the controller for calculating an air-fuel ratio feedback correction coefficient for the engine cylinders of the first group.

In the step S41, the controller 3 calculates the air-fuel ratio feedback correction coefficient α1 by the subroutine of FIG. 5 for the cylinders of the first group 1A. The known proportional integral control is applied to this calculation.

First, referring to FIG. 5, in a step S101, the controller 3 performs analog/digital conversion on the output of the upstream oxygen sensor 12A, and reads it as an oxygen concentration index value OSF1.

In a following step S102, the oxygen concentration index value OSF1 is compared with a preset slice level SLF. Here, the oxygen concentration index value OSF1 shows a smaller value than the slice level SLF under a lean air-fuel ratio and a larger value than the slice level SLF under a rich air-fuel ratio.

When the oxygen concentration index value OSF1 is smaller than the slice level SLF, ill a step S103, the controller 3 sets an air-fuel ratio flag F11 to zero which means a lean air-fuel ratio. When the oxygen concentration index value OSF1 is not smaller than the slice level SLF, in a step S104, the controller 3 sets the air-fuel ratio flag F11 to unity which means a rich air-fuel ratio. Here, the values which the air-fuel ratio flag F11 can take are only zero and unity. For convenience, the stoichiometric air-fuel ratio is treated as a rich air-fuel ratio.

In a following step S105, it is determined whether or not the value of the air-fuel ratio flag F11 has varied from the air-fuel ratio flag F11 on the immediately preceding occasion the subroutine was executed. When the value of the air-fuel ratio flag F11 is the same as the value on the immediately preceding occasion, it shows that a rich air-fuel ratio or a lean air-fuel ratio is continuing. When the value of the air-fuel ratio flag F11 differs from the value on the immediately preceding occasion the subroutine was executed, it means there was a change from a rich air-fuel ratio to a lean air-fuel ratio, or vice-versa.

When the value of the air-fuel ratio flag F11 differs from the value on the immediately preceding occasion, in a step S106, the controller 3 determines whether or not the air-fuel ratio flag F11 is zero, i.e., whether or not there was a change from a rich air-fuel ratio to a lean air-fuel ratio, or a change from a lean air-fuel ratio to a rich air-fuel ratio.

When the air-fuel ratio flag F11 is zero, i.e., when it varies from a rich air-fuel ratio to a lean air-fuel ratio, the present air-fuel ratio feedback correction coefficient α1 is stored in a step S107 as an air-fuel ratio feedback correction coefficient minimum value α1min. In applying proportional integral control to the feedback control of the air-fuel ratio targeted at the stoichiometric air-fuel ratio, provided that a rich air-fuel ratio continues, the air-fuel ratio feedback correction coefficient α1 continues decreasing in order to decrease the fuel injection amount. Therefore, the air-fuel ratio feedback correction coefficient α1 immediately before the air-fuel ratio changes from rich to lean, is the minimum value of the air-fuel ratio feedback correction coefficient during the rich period.

In a following step S108, the controller 3 stores a value obtained by adding a proportional increase value PL1 to the air-fuel ratio feedback correction coefficient α1 as a new air-fuel ratio feedback correction coefficient α1. Let the proportional increase value PL1 be a constant. The new air-fuel ratio feedback correction coefficient α1 set here is applied on the next occasion when the routine for calculating the fuel injection amount of FIG. 3 is executed.

In a following step S109, the controller 3 sets an inversion flag F2 to unity. The inversion flag F2 takes an integral value from zero to two. When F2 is zero, it shows that the air-fuel ratio continues to be lean or rich, when F2 is unity, it shows that the air-fuel ratio changed from rich to lean, and when F2 is two, it shows that the air-fuel ratio changed from lean to rich.

In a following step S110, an inversion counter value CTA is incremented. The inversion counter value CTA is a value showing the number of times there has been a change from rich to lean since air-fuel ratio feedback control started, and its initial value is zero. After the processing of the step S110, the controller 3 terminates the subroutine.

On the other hand, when in the step S106, the air-fuel ratio flag F11 is not zero, it shows that the air-fuel ratio varied from lean to rich. In this case, in a step S111, the controller 3 stores the present air-fuel ratio feedback correction coefficient α1 as an air-fuel ratio feedback correction coefficient maximum value α1max. In applying proportional integral control to the feedback control of the air-fuel ratio targeted at the stoichiometric air-fuel ratio, provided that a lean air-fuel ratio continues, the air-fuel ratio feedback correction coefficient α1 continues increasing in order to increase the fuel injection amount. Therefore, the air-fuel ratio feedback correction coefficient α1 immediately before the air-fuel ratio changed from lean to rich, is the maximum of the air-fuel ratio feedback correction coefficient in the lean period.

In a following step S112, the controller 3 stores a value obtained by subtracting a proportionality decrease value PR1 from the air-fuel ratio feedback correction coefficient α1 as a new air-fuel ratio feedback correction coefficient α1. Let the proportional decrease value PR1 be a constant. The new air-fuel ratio feedback correction coefficient α1 set here is applied on the next occasion when the routine for calculating the fuel injection amount of FIG. 3 is executed.

In a following step S113, the controller 3 sets the inversion flag F2 to two. After the processing of the step S113, the controller 3 terminates the subroutine.

As seen from the flowchart, the inversion counter value CTA is incremented only when the air-fuel ratio has changed from rich to lean, and when the air-fuel ratio has changed from lean to rich, the inversion counter value CTA is not incremented. As the air-fuel ratio varies repeatedly between rich and lean, the number of variations from rich to lean and from lean to rich are basically identical. Therefore, in this subroutine, only the number of times with which the air-fuel ratio inverted from rich to lean is counted.

Now, in the step S105, when the value of the air-fuel ratio flag F11 is the same as the value on the immediately preceding occasion the subroutine was executed, in a step S114, the controller 3 determines whether or not the air-fuel ratio flag F11 is zero. Here, this means that, when the air-fuel ratio flag F11 is zero, a lean air-fuel ratio is maintained, and when the air-fuel ratio flag F11 is not zero, a rich air-fuel ratio is maintained.

When the air-fuel ratio flag F11 is zero, in a step S115, the controller 3 stores a value obtained by adding an integral increase value IL to the air-fuel ratio feedback correction coefficient α1 as a new air-fuel ratio feedback correction coefficient α1. It will be assumed that the integral increase value IL is a smaller value than the proportional increase value PL. The air-fuel ratio feedback correction coefficient α1 which is newly set here is applied on the next occasion that the routine for calculating the fuel injection amount of FIG. 3 is executed.

In a following step S116, after setting the inversion flag F2 to zero, the controller 3 terminates the subroutine.

When the air-fuel ratio flag F11 is not zero in the step S114, in a step S117, the controller 3 stores a value obtained by deducting the integral decrease value IR from the air-fuel ratio feedback correction coefficient α1, as a new air-fuel ratio feedback correction coefficient α1. It will be assumed that the integral decrease value IR is a smaller value than the proportional decrease value PR. The air-fuel ratio feedback correction coefficient α1 which is newly set here is applied on the next occasion that the routine for calculating the fuel injection amount of FIG. 3 is executed.

After setting the inversion flag F2 to zero in the following step S118, the controller 3 terminates the subroutine.

Figure 6:
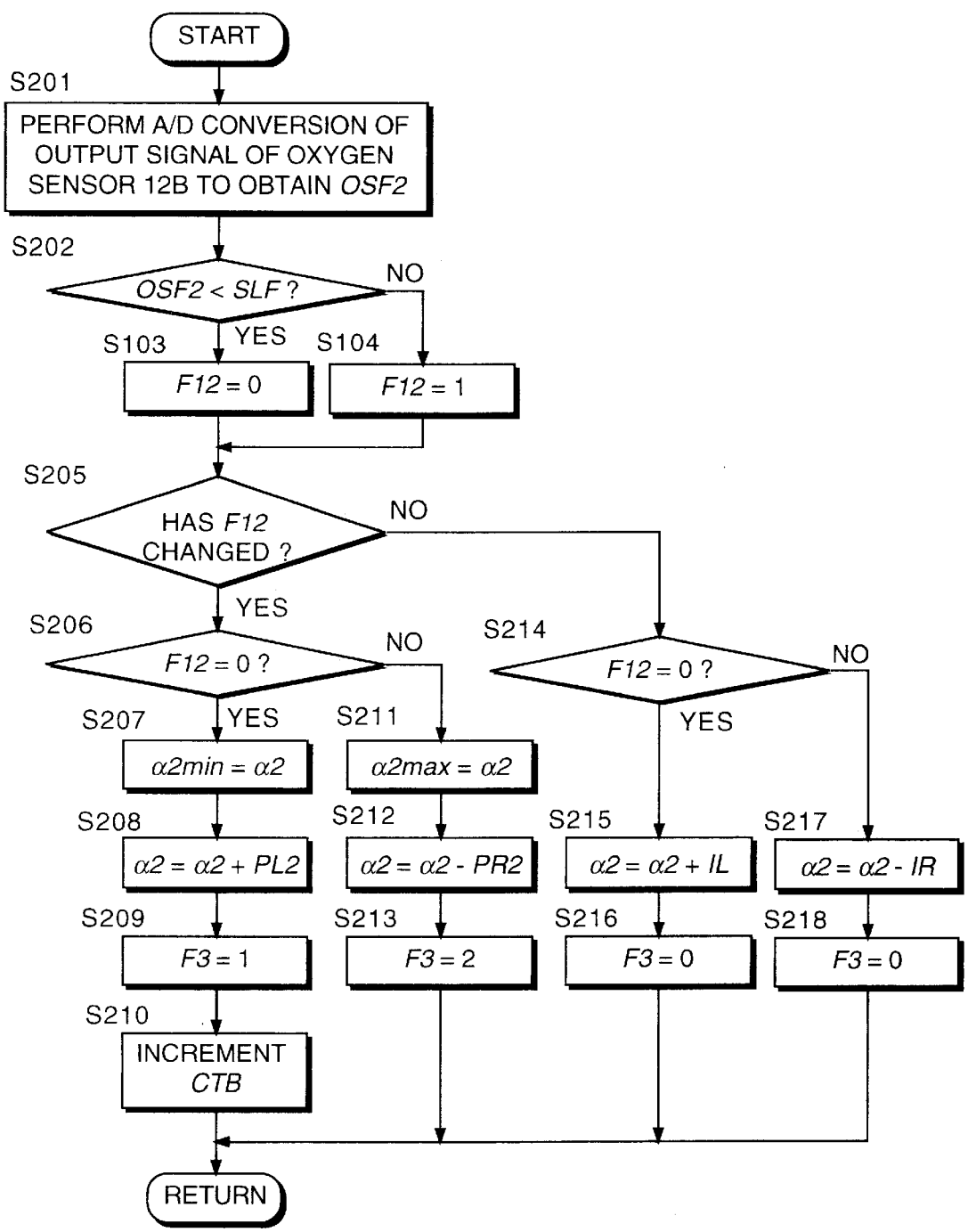
FIG. 6 is similar to FIG. 5, but describing a subroutine for calculating an air-fuel ratio feedback correction coefficient for the engine cylinders of the second group.

Now, referring again to FIGS. 11A and 11B, after performing the subroutine of FIG. 5 in the step S41, the controller 3 performs the subroutine of FIG. 6 in a following step S42.

The algorithm of the subroutine of FIG. 6 is the same as that of the subroutine of FIG. 5 which has already been described. An oxygen concentration index value OSF2 acquired from the output of the upstream oxygen sensor 12B in the subroutine of FIG. 6 corresponds to the oxygen concentration index value OSF1 of FIG. 5. Likewise, an air-fuel ratio flag F12 of FIG. 6 corresponds to the air-fuel ratio flag F11 of FIG. 5, an air-fuel ratio feedback correction coefficient α2 of FIG. 6 corresponds to the air-fuel ratio feedback correction coefficient α1 of FIG. 5, and an air-fuel ratio feedback correction coefficient minimum value α2min of FIG. 6 corresponds to the air-fuel ratio feedback correction coefficient minimum value α1min of FIG. 5 an air-fuel ratio feedback correction coefficient maximum α2max of FIG. 6 corresponds to the air-fuel ratio feedback correction coefficient maximum α1max of FIG. 5, an inversion flag F3 of FIG. 6 corresponds to the inversion flag F2 of FIG. 5, and an inversion counter value CTB of FIG. 6 corresponds to the inversion counter value CTA of FIG. 5, respectively.

After performing the subroutine of FIG. 6, in a step S43 of FIG. 11A, the controller 3 sets the air-fuel ratio feedback correction coefficient αR for the cylinders of the first group 1A to be equal to α1 and the air-fuel ratio feedback correction coefficient αL for the cylinders of the second group 1B to be equal to α2. In a following step S44, the controller 3 determines whether or not the learning conditions of the air-fuel ratio feedback correction coefficient are satisfied. The learning conditions of the air-fuel ratio feedback correction coefficient are disclosed in U.S. Pat. No. 5,271,374. so their description will be omitted here.

When the learning conditions are not satisfied in the step S44, the controller 3 terminates the routine immediately, without performing further steps. When the learning conditions are satisfied in the step S44 the controller 3, in steps S45–S48, performs learning of the air-fuel ratio feedback coefficients α1, α2. Specifically, the learning correction coefficients Lα1 and Lα2 are updated.

Figure 7:
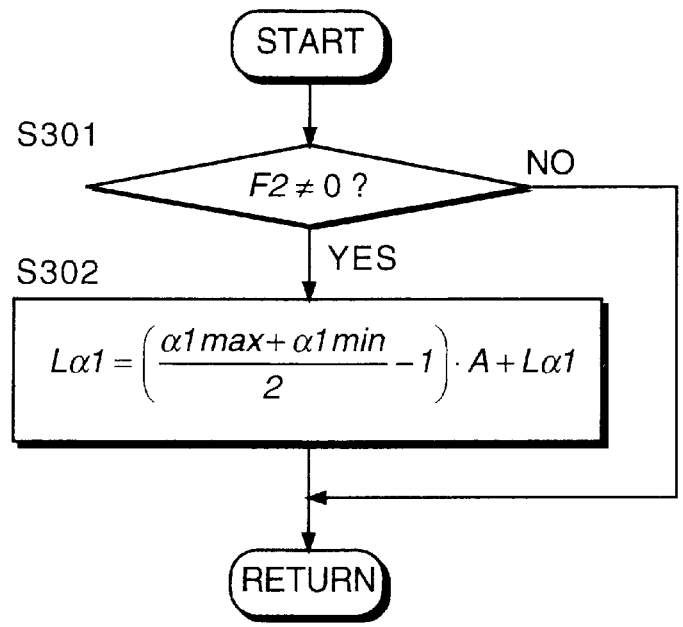
FIG. 7 is a flowchart of a subroutine performed by the controller for updating an air-fuel ratio feedback coefficient learning value for the engine cylinders of the first group.

First, in a step S45, the learning correction coefficient Lα1 for the cylinders of the first group 1A is updated by the subroutine shown in FIG. 7.

Referring to FIG. 7, the controller 3 determines whether or not the inversion flags F2 is a value other than zero in a step S301. When the inversion flag F2 is a value other than zero, it shows that the air-fuel ratio has changed from rich to lean, or vice-versa.

When the inversion flag F2 is zero, it means that a lean air-fuel ratio or a rich air-fuel ratio is continuing.

When the inversion flag F2 is zero, the controller 3 terminates the routine without updating the learning correction coefficient Lα1. That is, updating of the learning correction coefficient Lα1 is performed only when the air-fuel ratio has changed from rich to lean or vice-versa.

When the inversion flag F2 is not zero, the learning correction coefficient Lα1 is updated by the next Equation (4) in a step S302. Lα1 on the right hand side of the Equation (4) is the value before updating, and Lα1 on the left hand side is the value updated by executing this subroutine.

$$L\alpha 1 = \left( \frac{\alpha 1 \max + \alpha 1 \min}{2} - 1 \right) \cdot A + L\alpha 1 \quad (4)$$

where, A=constant.

As shown in Equation (4), in the step S302, the learning correction coefficient Lα1 is updated based on the average value of the maximum value α1max of the air-fuel ratio feedback correction coefficient α1 during the immediately preceding lean period, and the minimum value α1min of the air-fuel ratio feedback correction coefficient α1 during the immediately preceding rich period.

After updating the learning value Lα1 in the step S302, the controller 3 terminates the subroutine.

Figure 8:
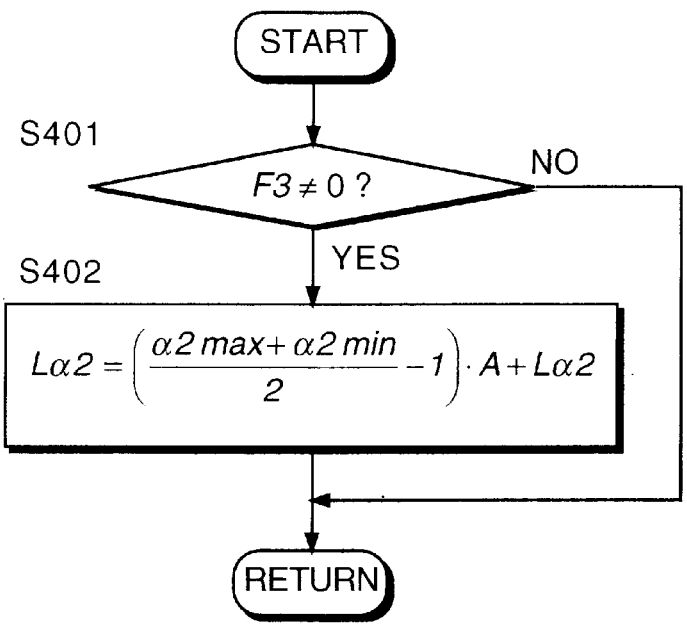
FIG. 8 is similar to FIG. 7, but describing a subroutine for updating an air-fuel ratio feedback correction coefficient learning value for the engine cylinders of the second group.

Referring again to FIGS. 11A and 11B, after updating the learning value Lα1 in the step S45, the controller 3 updates the learning correction coefficient Lα2 for the cylinders of the second bank 1B in a step S46 by the subroutine showing in FIG. 8. The algorithm of the subroutine of FIG. 8 is identical to that of the subroutine of FIG. 7.

That is, only when an inversion flag F3 is a value other than zero in a step S401, the learning correction coefficient Lα2 is updated by the next Equation (5) in a step S402.

$$L\alpha 2 = \left( \frac{\alpha 2 \max + \alpha 2 \min}{2} - 1 \right) A + L\alpha 2 \quad (5)$$

After updating the learning value Lα2 in the step S402, the controller 3 terminates the subroutine.

Referring again to FIGS. 11A and 11B, after updating the learning correction coefficients Lα1 and Lα2, the controller 3 sets the convergence flags Fcv1, Fcv2 which show whether the learning correction coefficients Lα1, Lα2 have converged, in the steps S47 and S48.

Figure 9:
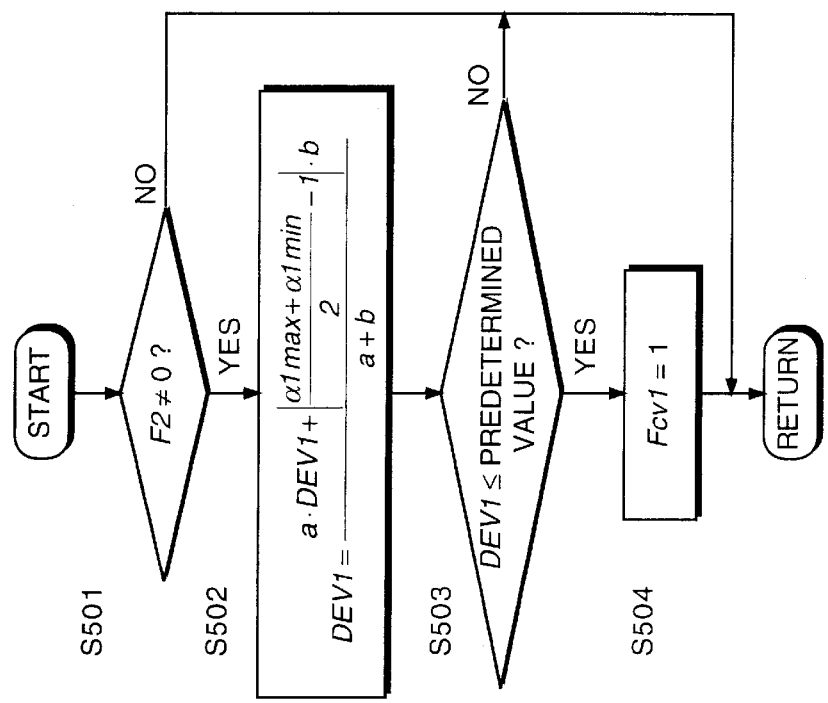
FIG. 9 is a flowchart describing a subroutine performed by the controller for determining a learning value convergence for the engine cylinders of the first group.

In the step S47, the convergence flag Fcv1 relating to the learning correction coefficient Lα1 is set by the subroutine shown in FIG. 9.

Referring to FIG. 9, in a step S501, the controller 3 first determines whether or not the inversion flag F2 is a value other than zero. As updating of the learning correction coefficient Lα1 is not performed when the inversion flag F2 is zero as mentioned above, the determination of whether or not the learning correction coefficient Lα1 has converged is not performed, either. In this case, the controller 3 terminates the subroutine immediately without performing further steps.

When the inversion flag F2 is a value other than zero, the controller 3 updates a deviation DEV1 by the next Equation (6) in a step S502. DEV1 on the right hand side of Equation (6) is a value calculated on the immediately preceding occasion the subroutine was executed, and DEV1 on the left hand side shows a value updated by the execution of this subroutine.

$$DEV1 = \frac{a \cdot DEV1 + \left| \frac{\alpha 1 \max + \alpha 1 \min}{2} - 1 \right| \cdot b}{a + b} \quad (6)$$

where, a, b=constant.

The deviation DEV1 becomes a larger value, the larger the value of $$\left| \frac{\alpha 1 \max + \alpha 1 \min}{2} - 1 \right|.$$

as shown in Equation (6). In other words, the deviation DEV1 becomes larger the larger deviation of the average value of the maximum value α1max and the minimum value α1min from unity. i.e., the stoichiometric air-fuel ratio equivalent value.

In a following step S503, the controller 3 compares the deviation DEV1 with a predetermined value. When the deviation DEV1 falls below the predetermined value, it is considered that the change of the learning correction coefficient Lα1 has converged, and the convergence flag Fcv1 is set to unity in a step S504. The initial value of the convergence test flag Fcv1 is zero.

When the deviation DEV1 is larger than the predetermined value, the step S504 is skipped, and the subroutine is terminated while the convergence test flag Fcv1 is held at zero.

Figure 10:
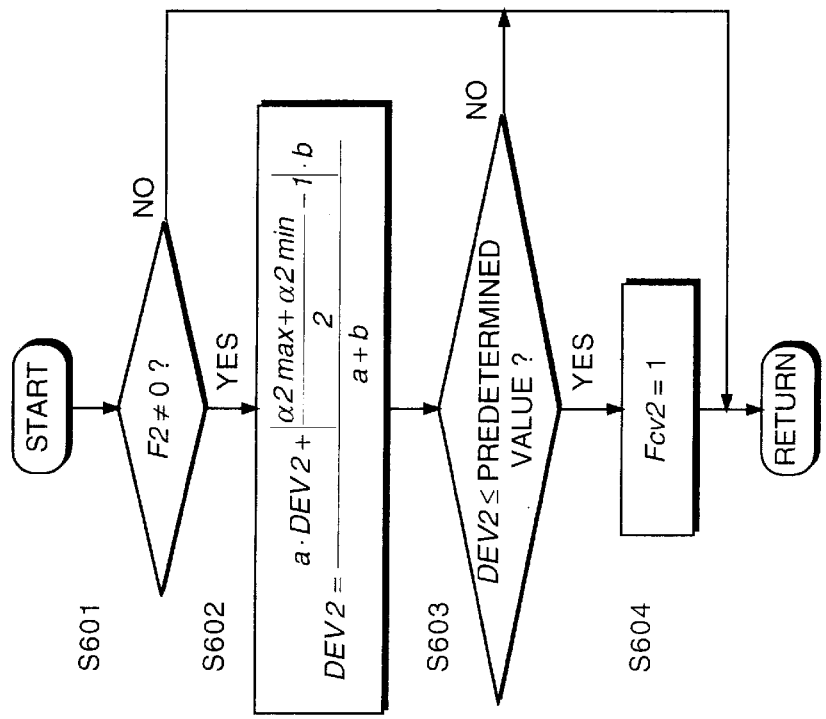
FIG. 10 is similar to FIG. 9, but describing a subroutine for determining a learning value convergence for the engine cylinders of the second group.

Referring again to FIGS. 11A and 11B, in a step S48, the controller 3 sets the convergence test flag Fcv2 relating to the learning correction coefficient Lα2 by the subroutine shown in FIG. 10.

The algorithm of the subroutine of FIG. 10 is identical to that of the subroutine of FIG. 9.

That is, in a step S601, only when the inversion flag F3 is a value other than zero, a deviation DEV2 is calculated by the next Equation (7) in a step S602.

$$DEV2 = \frac{a \cdot DEV2 + \left|\frac{\alpha 2max + \alpha 2min}{2} - 1\right| \cdot b}{a+b} \quad (7)$$

In a step S603, only when the deviation DEV2 falls below the predetermined value, it is considered that the change of the learning correction coefficient Lα2 has converged, and the convergence test flag Fcv2 is set to unity in a step S604. The initial value of the convergence test flag Fcv2 is zero. When the deviation DEV2 is larger than the predetermined value, the step S604 is skipped, and the subroutine is terminated while the convergence test flag Fcv2 is held at zero.

Referring again to FIGS. 11A and 11B, the controller 3 repeats the processing of the steps S41–S48 in this way until the variations of both the learning correction coefficient Lα1, Lα2 have converged.

On the other hand, when it is determined that both the convergence flags Fcv1, Fcv2 are unity in the step S26, the controller 3 determines whether or not the control mode flag Fa is zero in the step S27. The control mode flag Fa takes an integral value from zero to four. The initial value of the control mode flag Fa is zero.

In the aforesaid processing of the steps S41–S48, updating of the control mode flag Fa is not performed. Therefore, after the start-up of the engine 1 (100), the control mode flag Fa must be zero when the determination of the step S27 is performed for the first time.

When the control mode flag Fa is zero in the step S27, the controller 3 resets the inversion counter value CTA to zero in a step S28. In a following step S29, after setting the control mode flag Fa to unity, processing of a step S30 is performed.

When the control mode flag Fa is a value other than zero in the step S27, the controller 3 skips the steps S28, S29, and performs the processing of the step S30. The processing of the steps S28, S29 is therefore performed only once immediately after the variations of both the learning correction coefficients Lα1, Lα2, have converged.

In the step S30, the controller 3 determines whether or not the control mode flag Fa is unity. The control mode flag Fa when the step S41 is performed immediately after the convergence of both the learning correction coefficient Lα1, Lα2, must be unity. In this case, the controller 3 performs the processing of steps S31–S36.

In the step S31, the air-fuel ratio feedback correction coefficient α1 for the cylinders of the first group 1A is calculated by executing the aforesaid subroutine of FIG. 5.

In the following step S32, the air-fuel ratio feedback correction coefficient αR for the cylinders of the first group 1A is set equal to the calculated value α1 obtained in the step S31. On the other hand, the air-fuel ratio feedback correction coefficient αL for the cylinders of the second group TB is also set equal to the calculated value α1.

In a following step S33, it is determined whether or not the inversion counter value CTA has reached a predetermined value C1. The predetermined value C1 shows the number of times of inversion of the air-fuel ratio required for deterioration determination of the catalyst.

When the inversion counter value CTA has reached the predetermined value C1, the inversion counter value CTA is reset to zero in the step S34. In the following step S35, after setting the control mode flag Fa to two, processing of the step S36 is performed.

When the inversion counter value CTA has not reached the predetermined value C1 in the step S33, the steps S34, S35 are skipped and the processing of the step S36 is performed. In the step S36, the catalyst deterioration diagnosis is performed based on the output of the downstream oxygen sensor 12C. The determination performed here is not the diagnosis of each of the catalytic converters 11A–11C, but the determination of whether the catalysts in the converters 11A–11C have deteriorated on the whole, as mentioned above. As the algorithm of deterioration diagnosis of the catalyst is known from the aforesaid U.S. Pat. No. 5,953,910, its detailed description is omitted here.

After performing deterioration diagnosis of the catalysts, the controller 3 terminates the routine. The deterioration diagnosis of the catalyst performed in the step S36 is thus performed by setting the air-fuel ratio feedback correction coefficient αR for the first group 1A, and the air-fuel ratio feedback correction coefficient αL for the second group 1B to the same value of α1, i.e., the air-fuel ratio feedback correction coefficient that was calculated for the first group 1A.

As a result, the air-fuel ratio variations of the first group 1A and second group 1B have identical phase.

On the other hand, until the variations of the learning correction coefficients Lα1, Lα2 converge in the determination of the step S26, the air-fuel ratios of the first group 1A and second group 1B are controlled using different air-fuel ratio feedback control coefficients α1, α2.

Referring to FIGS. 12A and 12B, when performing air-fuel ratio control using the different air-fuel ratio feedback correction coefficients α1, α2, as shown by the different control coefficient application region in the drawing, the phases of the air-fuel ratio variations for the first group 1A and second group 1B do not coincide. At a time t1, when the variations of the learning correction coefficients Lα1, Lα2 converge, the common air-fuel ratio feedback correction coefficient α1 is used by the first group 1A and second group 1B.

Consequently, as shown by the common control coefficient application region of the drawing, the air-fuel ratio variations for the first group 1A and second group 1B have identical phase. Therefore, in the deterioration diagnosis of the catalyst of the step S36 performed in this state, the air-fuel ratio variations of the first group 1A and second group 1B do not cancel each other out, and a precise diagnosis is performed based on the air-fuel ratio detected by the downstream oxygen sensor 12C.

Now, referring again to FIGS. 11A and 11B, when the control mode flag Fa is set to two in the step S35, on the next occasion when the routine is performed, the determination of the step S30 is negative and the controller 3 determines whether or not the control mode flag Fa is two in a step S51. When the control mode flag Fa is two, the processing of the steps S52–S61 is performed. The processing of the steps S52–S59 is identical to the processing of the steps S41–S48 already described.

Namely, in the step S52, the air-fuel ratio feedback correction coefficient α1 relating to the first group 1A is calculated by execution of the subroutine of FIG. 5. In the following step S53, the air-fuel ratio feedback correction coefficient α2 for the second group 1B is calculated by execution of the subroutine of FIG. 6.

In the following step S54, the controller 3 sets the air-fuel ratio feedback correction coefficient αR for the cylinders of the first group 1A to be equal to α1 and the air-fuel ratio feedback correction coefficient αL for the cylinders of the second group 1B to be equal to α2.

In the following step S55, it is determined whether or not the air-fuel ratio feedback correction coefficient learning conditions are satisfied. When the learning conditions are not satisfied, the routine is terminated without performing further steps.

When the learning conditions are satisfied, the learning correction coefficient Lα1 for the cylinders of the first group 1A is updated in the step S56 by the subroutine shown in FIG. 7. In the following step S57 the learning correction coefficient Lα2 for the cylinders of the second group 1B is updated by the subroutine shown in FIG. 8.

In the following step S58, the convergence flag Fcv1 in connection with the learning correction coefficient Lα1 is set by the subroutine shown in FIG. 9. In the following step S59, the convergence flag Fcv2 in connection with the learning correction coefficient Lα2 is set by the subroutine shown in FIG. 10.

In the following step S60, it is determined whether or not both the convergence test flags Fcv1, Fcv2 are unity as in the step S26. When both the convergence test flags Fcv1, Fcv2 are unity, in the step S61, the controller 3 sets the control mode flag Fa to three, resets the inversion counter value CTB to zero, and terminates the routine. When one or both of the convergence test flags Fcv1, Fcv2 are unity, the controller 3 terminates the routine without proceeding to the step S61.

The processing from the steps S51–S61 is performed after the catalyst deterioration diagnosis by applying the air-fuel ratio feedback correction coefficient α1 for the cylinders of the first group 1A in the step S36, to the cylinders of the first group 1A and second group 1B. Here, feedback control of the air-fuel ratio and learning of the air-fuel ratio feedback correction coefficient are performed again. This process is repeatedly performed until the learning value of the air-fuel ratio feedback correction coefficient of each group converges.

If it is determined, as a result of the determination of the step S60, that the variation of the learning correction coefficients Lα1, Lα2 have converged, in the execution of the following routine, the determination result of the step S51 will be negative, and the controller 3 will perform the processing of steps S71–S76. The processing of the step S61 is preliminary processing for performing the processing of the steps S71–S76 on the next occasion that the routine is executed.

Although the processing of the steps S71–S76 is similar to the processing of the steps S31–S36, the point that the calculation value α2 of the air-fuel ratio feedback correction coefficient for the cylinders of the second group 1B is used for the correction coefficients αR and αL which are applied to the feedback control of air-fuel ratio, is different from the processing of the steps S31–S36.

Specifically, in the step S71, the controller 3 calculates the air-fuel ratio feedback correction coefficient α2 for the cylinders of the second group 1B by performing the subroutine of FIG. 6 as in the step S42.

In the following step S72, the air-fuel ratio feedback correction coefficient αR for the cylinders of the first group 1A is set equal to the calculated value α2 obtained in the step S71. The air-fuel ratio feedback correction coefficient αL for the cylinders of the second group 1B is also set equal to the calculated value α2.

In the following step S73, it is determined whether or not the inversion counter value CTB has reached the predetermined value C1. When the inversion counter value CTB reaches the predetermined value C1, the inversion counter value CTB is reset to zero in the step S74. In the following step S75, after setting the control mode flag Fa to four, the processing of the step S76 is performed. When the inversion counter value CTB has not reached the predetermined value C1 in the step S73 the steps S74 and S75 are skipped and the processing of step S76 is performed.

In the step S76, deterioration diagnosis of the catalyst is performed based on the output of the downstream oxygen sensor 12C as in the step S36.

Further, in the step S76, a total diagnosis including the diagnostic result of the step S36 is performed. That is, when both the diagnostic result of the step S36 applied to the calculated value α1 of the air-fuel ratio feedback correction coefficient for the cylinders of the first group 1A, and the diagnostic result of applying the calculated value α2 of the air-fuel ratio feedback correction coefficient for the cylinders of the second group 1B both show deterioration of the catalyst, an overall determination that the catalyst has deteriorated is made. The result of this determination is issued to a driver of the vehicle in the form of the lighting of a warning light. The warning light is not turned on when the diagnostic result of either or both is normal.

Thus, when the deterioration diagnosis using the calculated value α1 of the air-fuel ratio feedback correction coefficient for the cylinders of the first group 1A and the deterioration diagnosis using the calculated value α2 of the air-fuel ratio feedback correction coefficient for the cylinders of the second group 1B, are complete, the control mode flag Fa is set to four. Consequently, feedback control and learning control of the air-fuel ratio by the usual steps S41–S48 are then performed until the engine 1 (100) stops operating, or the engine 1 (100) performs operation under the air-fuel ratio clamped by the step S22 and S23.

Referring to FIGS. 13A–13D, as the calculated value α1 of the air-fuel ratio feedback correction coefficient for the first group 1A will be applied to air-fuel ratio feedback control of the cylinders of the second group 1B while the aforesaid processing of the steps S3–S36 is performed, the real air-fuel ratio of the cylinders of the second group 1B will deviated somewhat from the stoichiometric air-fuel ratio. However, since the air-fuel ratio variations for the first group 1A and second group 1B have identical phase, deterioration diagnosis of the catalyst is performed correctly.

After deterioration diagnosis of the catalyst using the calculated value α1 is completed at a time t2, feedback control of the air-fuel ratio using the air-fuel ratio feedback correction coefficients α1, α2, and learning of the learning correction coefficient Lα1, Lα2, are again performed by the processing of the steps S52–S61.

When the variations of the learning correction coefficients Lα1, Lα2 converge at a time t3, deterioration diagnosis of the catalyst using the calculated value α2 is performed by the processing of the steps S71–S76.

Also in this diagnosis, as air-fuel ratio control is performed in the cylinders of the first group 1A and the cylinders of the second group 1B by the application of the common air-fuel ratio feedback correction coefficient α2, the air-fuel ratio variation has identical phase in the first group 1A and second group 1B.

Therefore, in deterioration diagnosis of the catalyst of the step S76 performed in this state, the air-fuel ratio variations of the first group 1A and second group 1B do not cancel out, and a precise diagnosis can be performed based on the air-fuel ratio detected by the downstream oxygen sensor 12C. Further, the deterioration of the catalyst can be finally determined by combining the diagnostic results obtained using the calculated values α1, α2.

The contents of Tokugan 2001-316293, with a filing date of Oct. 15, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, this embodiment was applied to the engine 1 or 100 having two cylinder groups for the exhaust gas system, but the deterioration diagnostic system according to this invention may be applied also to an engine having three or more cylinder groups for the exhaust gas system. Moreover, the number of cylinders in each group may not be plural, but singular.

What is claimed is:

1. An air-fuel ratio control device for an internal combustion engine, the engine comprising a first exhaust passage connected to a first cylinder and provided with a first exhaust gas purification device which has an oxygen storage function, a second exhaust passage connected to a second cylinder and provided with a second exhaust gas purification device which has an oxygen storage function, and a collective exhaust passage which collects exhaust gas from the first exhaust passage and the second exhaust passage; the control device comprising:

a first fuel supply device which supplies fuel to the first cylinder to generate an air-fuel mixture to be burned in the first cylinder;

a second fuel supply device which supplies fuel to the second cylinder to generate an air-fuel mixture to be burned in the second cylinder;

a first oxygen sensor which reacts to an oxygen concentration in exhaust gas in the first exhaust passage upstream of the first exhaust gas purification device;

a second oxygen sensor which reacts to an oxygen concentration in exhaust gas in the second exhaust passage upstream of the second exhaust gas purification device;

a third oxygen sensor which reacts to an oxygen concentration in exhaust gas in the collective exhaust passage; and a programmable controller programmed to:

calculate a first feedback correction coefficient for controlling an air-fuel ratio of the air-fuel mixture in the first cylinder to a target air-fuel ratio based on a reaction of the first oxygen sensor;

feedback control a fuel supply amount of the first fuel supply device using the first feedback correction coefficient;

calculate a second feedback correction coefficient for controlling an air-fuel ratio of the air-fuel mixture in the second cylinder to the target air-fuel ratio based on a reaction of the second oxygen sensor;

feedback control a fuel supply amount of the second fuel supply device using the second air-fuel ratio feedback correction coefficient;

determine whether or not a predetermined condition for performing deterioration diagnosis of the exhaust purification devices is satisfied; and perform the deterioration diagnosis of the exhaust purification devices, when the predetermined condition is satisfied, based on a reaction of the third oxygen sensor while feedback controlling the fuel supply amount of the first fuel supply device and the fuel supply amount of the second fuel supply device using the first feedback correction coefficient;

wherein the controller is further programmed to calculate a first learning correction coefficient of the first feedback correction coefficient, perform open loop control of the fuel supply amount of the first fuel supply device using the first learning correction coefficient, calculate a second learning correction coefficient of the second feedback correction coefficient, perform open loop control of the fuel supply amount of the second fuel supply device using the second learning correction coefficient, determine whether or not both the first learning correction coefficient and the second learning correction coefficient have converged, and when one of the first learning correction coefficient or the second learning correction coefficient have not converged, determine that the predetermined condition is not satisfied.

2. The air-fuel ratio control device as defined in claim 1, wherein the controller is further programmed to perform the deterioration diagnosis of the exhaust purification devices, when the predetermined condition is satisfied, while controlling the fuel supply amount of the first fuel supply device using the first feedback correction coefficient and the first learning control coefficient, and controlling the fuel supply amount of the second fuel supply device using the first feedback correction coefficient and the second learning control coefficient.

3. The air-fuel ratio control device as defined in claim 1, wherein the controller is further programmed to perform the deterioration diagnosis of the exhaust purification devices based on the reaction of the third oxygen sensor while feedback controlling the fuel supply amount of the first fuel supply device and the fuel supply amount of the second fuel supply device using the second feedback correction coefficient, after performing the deterioration diagnosis of the exhaust purification devices based on the reaction of the third oxygen sensor while feedback controlling the fuel supply amount of the first fuel supply device and the fuel supply amount of the second fuel supply device using the first feedback correction coefficient.

4. The air-fuel ratio control device as defined in claim 3, wherein the controller is further programmed, after performing the deterioration diagnosis of the exhaust purification device based on the reaction of the third oxygen sensor while feedback controlling the fuel supply amount of the first fuel supply device and the fuel supply amount of the second fuel supply device using the second feedback correction coefficient, to prevent the deterioration diagnosis of the exhaust purification device from being performed until the engine stops running.

5. The air-fuel ratio control device as defined in claim 1, wherein the controller is further programmed, after performing the deterioration diagnosis of the exhaust purification device, to calculate a first learning correction coefficient by learning the first feedback correction coefficient, perform open loop control of the fuel supply amount of the first fuel supply device using the first learning correction coefficient, calculate a second learning correction coefficient by learning the second feedback correction coefficient, perform open loop control of the fuel supply amount of the second fuel supply device using the second learning correction coefficient, determine whether or not both the first learning correction coefficient and the second learning correction coefficient have converged, and perform the deterioration diagnosis of the exhaust purification devices, when both the first learning correction coefficient and the second learning correction coefficient have converged, based on a reaction of the third oxygen sensor while feedback controlling the fuel supply amount of the first fuel supply device and the fuel supply amount of the second fuel supply device using the second feedback correction coefficient.

6. The air-fuel ratio control device as defined in claim 1, wherein the collective exhaust passage is provided with a third exhaust gas purification device which has an oxygen storage function upstream of the third oxygen sensor.

7. An air-fuel ratio control device for an internal combustion engine, the engine comprising a first exhaust passage connected to a first cylinder and provided with a first exhaust gas purification means which has an oxygen storage function, a second exhaust passage connected to a second cylinder and provided with a second exhaust gas purification means which has an oxygen storage function, and a collective exhaust passage which collects exhaust gas from the first exhaust passage and the second exhaust passage; the control device comprising:

- a first fuel supply means for supplying fuel to the first cylinder to generate an air-fuel mixture to be burned in the first cylinder;
- a second fuel supply means for supplying fuel to the second cylinder to generate an air-fuel mixture to be burned in the second cylinder;
- a first oxygen sensing means for reacting to an oxygen concentration in exhaust gas in the first exhaust passage upstream of the first exhaust gas purification means;
- a second oxygen sensing means for reacting to an oxygen concentration in exhaust gas in the second exhaust passage upstream of the second exhaust gas purification means;
- a third oxygen sensing means for reacting to an oxygen concentration in exhaust gas in the collective exhaust passage;
- means for calculating a first feedback correction coefficient for controlling an air-fuel ratio of the air-fuel mixture in the first cylinder to a target air-fuel ratio based on a reaction of the first oxygen sensing means;
- means for feedback controlling a fuel supply amount of the first fuel supply means using the first feedback correction coefficient;
- means for calculating a second feedback correction coefficient for controlling an air-fuel ratio of the air-fuel mixture in the second cylinder to the target air-fuel ratio based on a reaction of the second oxygen sensing means;
- means for feedback controlling a fuel supply amount of the second fuel supply means using the second air-fuel ratio feedback correction coefficient;
- means for determining whether or not a predetermined condition for performing deterioration diagnosis of the exhaust purification means is satisfied;
- means for performing the deterioration diagnosis of the exhaust purification means, when the predetermined condition is satisfied, based on a reaction of the third oxygen sensing means while feedback controlling the fuel supply amount of the first fuel supply means and the fuel supply amount of the second fuel supply means using the first feedback correction coefficient;
- means for calculating a first learning correction coefficient of the first feedback correction coefficient;
- means for performing open loop control of the fuel supply amount of the first fuel supply means using the first learning correction coefficient;
- means for calculating a second learning correction coefficient of the second feedback correction coefficient;
- means for performing open loop control of the fuel supply amount of the second fuel supply means using the second learning correction coefficient;
- means for determining whether or not both the first learning correction coefficient and the second learning correction coefficient have converged; and
- means for determining that the predetermined condition is not satisfied when one of the first learning correction coefficient or the second learning correction coefficient have not converged.

8. An air-fuel ratio control method for an internal combustion engine, the engine comprising a first exhaust passage connected to a first cylinder and provided with a first exhaust gas purification device which has an oxygen storage function, a second exhaust passage connected to a second cylinder and provided with a second exhaust gas purification device which has an oxygen storage function, a collective exhaust passage which collects exhaust gas from the first exhaust passage and the second exhaust passage, a first fuel supply device which supplies fuel to the first cylinder to generate an air-fuel mixture to be burned in the first cylinder, and a second fuel supply device which supplies fuel to the second cylinder to generate an air-fuel mixture to be burned in the second cylinder; the method comprising:

- detecting a first oxygen concentration in exhaust gas in the first exhaust passage upstream of the first exhaust gas purification device;
- detecting a second oxygen concentration in exhaust gas in the second exhaust passage upstream of the second exhaust gas purification device;
- detecting a third oxygen concentration in exhaust gas in the collective exhaust passage;
- calculating a first feedback correction coefficient for controlling an air-fuel ratio of the air-fuel mixture in the first cylinder to a target air-fuel ratio based on the first oxygen concentration;
- feedback controlling a fuel supply amount of the first fuel supply device using the first feedback correction coefficient;
- calculating a second feedback correction coefficient for controlling an air-fuel ratio of the air-fuel mixture in the second cylinder to the target air-fuel ratio based on the second oxygen concentration;
- feedback controlling a fuel supply amount of the second fuel supply device using the second air-fuel ratio feedback correction coefficient;
- determining whether or not a predetermined condition for performing deterioration diagnosis of the exhaust purification devices is satisfied;
- performing the deterioration diagnosis of the exhaust purification devices, when the predetermined condition is satisfied, based on the third oxygen concentration while feedback controlling the fuel supply amount of the first fuel supply device and the fuel supply amount of the second fuel supply device using the first feedback correction coefficient;
- calculating a first learning correction coefficient of the first feedback correction coefficient;
- performing open loop control of the fuel supply amount of the first fuel supply device using the first learning correction coefficient;

calculating a second learning correction coefficient of the second feedback correction coefficient;

performing open loop control of the fuel supply amount of the second fuel supply device using the second learning correction coefficient;

determining whether or not both the first learning correction coefficient and the second learning correction coefficient have converged; and determining that the predetermined condition is not satisfied when one of the first learning correction coefficient or the second learning correction coefficient have not converged.

9. An air-fuel ratio control device for an internal combustion engine, the engine comprising a first exhaust passage connected to a first cylinder and provided with a first exhaust gas purification device which has an oxygen storage function, a second exhaust passage connected to a second cylinder and provided with a second exhaust gas purification device which has an oxygen storage function, and a collective exhaust passage which collects exhaust gas from the first exhaust passage and the second exhaust passage; the control device comprising:

a first fuel supply device which supplies fuel to the first cylinder to generate an air-fuel mixture to be burned in the first cylinder;

a second fuel supply device which supplies fuel to the second cylinder to generate an air-fuel mixture to be burned in the second cylinder;

a first oxygen sensor which reacts to an oxygen concentration in exhaust gas in the first exhaust passage upstream of the first exhaust gas purification device;

a second oxygen sensor which reacts to an oxygen concentration in exhaust gas in the second exhaust passage upstream of the second exhaust gas purification device;

a third oxygen sensor which reacts to an oxygen concentration in exhaust gas in the collective exhaust passage; and a programmable controller programmed to:

calculate a first feedback correction coefficient for controlling an air-fuel ratio of the air-fuel mixture in the first cylinder to a target air-fuel ratio based on a reaction of the first oxygen sensor;

feedback control a fuel supply amount of the first fuel supply device using the first feedback correction coefficient;

calculate a second feedback correction coefficient for controlling an air-fuel ratio of the air-fuel mixture in the second cylinder to the target air-fuel ratio based on a reaction of the second oxygen sensor;

feedback control a fuel supply amount of the second fuel supply device using the second air-fuel ratio feedback correction coefficient;

determine whether or not a predetermined condition for performing deterioration diagnosis of the exhaust purification devices is satisfied; and perform the deterioration diagnosis of the exhaust purification devices, when the predetermined condition is satisfied, based on a reaction of the third oxygen sensor while feedback controlling the fuel supply amount of the first fuel supply device and the fuel supply amount of the second fuel supply device using the first feedback correction coefficient;

wherein the controller is further programmed to perform the deterioration diagnosis of the exhaust purification devices based on the reaction of the third oxygen sensor while feedback controlling the fuel supply amount of the first fuel supply device and the fuel supply amount of the second fuel supply device using the second feedback correction coefficient, after performing the deterioration diagnosis of the exhaust purification devices based on the reaction of the third oxygen sensor while feedback controlling the fuel supply amount of the first fuel supply device and the fuel supply amount of the second fuel supply device using the first feedback correction coefficient.

* * * * *